United States Patent

Schmidt et al.

[11] 4,056,508
[45] Nov. 1, 1977

[54] DIFFICULTLY INFLAMMABLE POLYESTER MOLDING COMPOSITIONS

[75] Inventors: Werner Schmidt, St. Augustin; Egon Norbert Petersen, Neunkirchen; Hermann Richtzenhain, Much-Schwellenbach, all of Germany

[73] Assignee: Dynamit Nobel Aktiengesellschaft, Troisdorf, Germany

[21] Appl. No.: 620,071

[22] Filed: Oct. 6, 1975

Related U.S. Application Data

[63] Continuation of Ser. No. 516,944, Oct. 22, 1974, abandoned.

[30] Foreign Application Priority Data

Oct. 27, 1973 Germany .......................... 2354001

[51] Int. Cl.$^2$ .................... C08K 3/22; C08K 3/38; C08K 5/03
[52] U.S. Cl. .................... 260/45.75 B; 260/40 R; 260/45.7 R; 260/45.7 R J; 260/45.75 W
[58] Field of Search .................. 260/45.7 R, 45.75 B, 260/75 H, 861, 869, 45.7 RL

[56] References Cited

U.S. PATENT DOCUMENTS

| | | | |
|---|---|---|---|
| 3,671,487 | 6/1972 | Abolins | 260/40 |
| 3,751,396 | 8/1973 | Gall | 260/40 |
| 3,770,577 | 11/1973 | Humphrey | 162/159 |
| 3,792,116 | 2/1974 | Cardenas et al. | 260/861 |
| 3,816,307 | 6/1974 | Woods | 252/8.1 |
| 3,864,306 | 2/1975 | Dieckmann | 260/45.75 |
| 3,919,356 | 11/1975 | Boyer | 260/891 |
| 3,947,421 | 3/1976 | Seydl | 260/40 |
| 3,947,423 | 3/1976 | Hills | 260/45.8 |

FOREIGN PATENT DOCUMENTS 1,100,605  1/1968  United Kingdom.

OTHER PUBLICATIONS

Mark et al., J.A.C.S., 93: 14, July 1971, pp. 3538–3540.

*Primary Examiner*—Donald E. Czaja
*Assistant Examiner*—R. A. White
*Attorney, Agent, or Firm*—Burgess, Dinklage & Sprung

[57] ABSTRACT

A flame stabilized molding composition comprising:

1. A polyester which is the condensation product of an aromatic dicarboxylic acid, acid halide or ester and an aliphatic diol having more than 2 atoms in the chain, and 2. 1,4-bis-($\beta,\gamma,\gamma$-trichloroallyl)-2,3,5,6-tetrachlorobenzene of the formula

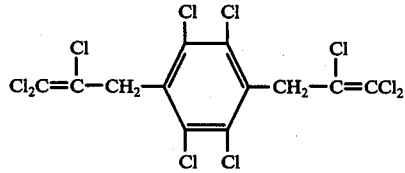

said 1,4-bis-($\beta,\gamma,\gamma$-trichloroallyl)-2,3,5,6-tetrachlorobenzene present in said molding composition in an amount of 5–30 weight percent, preferably 10–25%, based upon the weight of said polyester.

10 Claims, No Drawings

DIFFICULTLY INFLAMMABLE POLYESTER MOLDING COMPOSITIONS

This is a continuation of application Ser. No. 516,944, filed Oct. 22, 1974, now abandoned.

BACKGROUND OF THE INVENTION

1. Field of the Invention

This invention relates to polyester molding compositions and particularly to flame stabilized polyester molding compositions. This invention is particularly directed to the flame-stabilization of polyesters derived from an aromatic dicarboxylic acid halide or ester and an aliphatic diol having more than two carbon atoms in the chain. This invention is particularly directed to self-extinguishing flame-stabilized molding compositions containing 1,4-bis-($\beta,\gamma,\gamma$-trichloroallyl)-2,3,5,6-tetrachlorobenzene and a synergistically active quantity of an additional substance such as an antimony or boron compound.

2. Discussion of the Prior Art

On account of their attractive characteristics, thermoplastic polyesters, especially the polyalkyleneterephthalates, are being used to an ever increasing extent in many applications in mining, construction, the electrical industry and in textiles. Of growing importance are especially those types of polyester which are constructed on the basis of aromatic dicarboxylic acids or their polyester-forming derivatives, and aliphatic diols having more than two carbon atoms, particularly polypropyleneterephthalates or polybutyleneterephthalates. Such polyester molding compositions can be made into finished products by conventional methods, in extruders for example. They are especially well suited for the manufacture of injection molded products.

Their use is limited in many applications by the fact that they are relatively easily combustible. There has been no lack of attempts to make polyesters more resistant to flaming and combustion by the addition of appropriate agents. In addition to inorganic compounds, such as borates and aluminum hydrates, for example, organic sulfur, phosphorus and halogen compounds have been used as flameproofing agents. Many of these compounds are difficult to prepare, expensive, and of such poor effectiveness that great amounts of them have to be added to the polyesters in order to achieve a satisfactory effect.

The known flameproofing agents have proven unsuitable especially for polyesters on the basis of aromatic dicarboxylic acids or their polyester-forming derivatives and aliphatic diols having more than two carbon atoms. They often have the disadvantage of being not particularly compatible with the polyesters, this being manifested by the fact, for example, that "chalking" occurs in the finished products. Even during fabrication, decomposition products are frequently formed which corrode the apparatus and have an adverse effect on the characteristics of the molding compounds. It has also frequently been found that the volatility of the substances known hitherto is excessive, which results in a great hazard to health due to the formation of vapor during fabrication.

It has, therefore, become desirable to provide a self-extinguishing flame-stabilized polyester molding composition and it has become particularly desirable to provide a flame-stabilizing agent that can be readily incorporated into the polyester composition without chalking. It has also become desirable to provide a flame-stabilizer for a polyester molding composition which does not provide decomposition products which can corrode and foul the apparatuses used to make final molded articles. It has also become desirable to provide such a substance which does not have a high volatility and is not injurious to health.

SUMMARY OF THE INVENTION

The objects of the present invention are provided by a flame-stabilized molding composition comprising:

1. A polyester which is the condensation product of an aromatic dicarboxylic acid, acid halide or ester and an aliphatic diol having more than two carbon atoms in the chain; and
2. As a flame-proofing agent, 1,4-bis-($\beta,\gamma,\gamma$-trichloroallyl)-2,3,5,6-tetrachlorobenzene of the formula

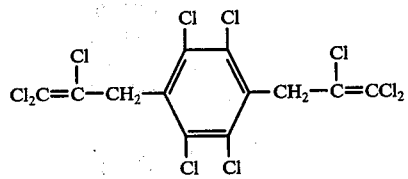

said 1,4-bis-($\beta,\gamma,\gamma$-trichloroallyl)-2,3,5,6-tetrachlorobenzene being present in said composition in an amount of 5–30 weight percent based upon the weight of said polyester. Preferably, the 1,4-bis-($\beta,\gamma,\gamma$-trichloroallyl)-2,3,5,6-tetrachlorobenzene being present in said composition in an amount of 5–30 weight present based upon the weight of said polyester. Preferably, the 1,4-bis-($\beta,\gamma,\gamma$-trichloroallyl)-2,3,5,6-tetrachlorobenzene is present in the molding composition in an amount of 10–25 percent by weight based upon the weight of the polyester.

It has been discovered in accordance with the present invention that the inclusion of 1,4-bis-($\beta,\gamma,\gamma$-trichloroallyl)-2,3,5,6-tetrachlorobenzene in a polyester molding composition which polyester is based on an aromatic dicarboxylic acid and/or other ester-forming derivatives and an aliphatic dicarboxylic acid of more than two carbon atoms renders the same virtually self-extinguishing. Thus, when the same is included in a polyester molding composition, say, in an amount of 20 parts per 100 parts of polyester together with, say, 2.5 to 5 parts of antimony oxide per 100 parts of polyester the polyester is rendered self-extinguishing such that when the same is subjected to a flame for a period of at least 10 seconds and removed therefrom, the sample specimen is extinguished immediately upon removal from the flame. Moreover, any polymer that drips from the specimen does not burn. Lesser amounts of 1,4-bis-($\beta,\gamma,\gamma$-trichloroallyl)-2,3,5,6-tetrachlorobenzene also render a test specimen sufficiently flame-resistant that after removal from the flame the flame is extinguished within a few seconds thereafter and the flame on polymers which drip from the specimen are extinguished as the drips fall.

DESCRIPTION OF SPECIFIC EMBODIMENTS

The polymer component of the molding composition of the invention consists wholly or mostly of a polyester of the above-named type, e.g., of polypropylene or polybutylene terephthalate, or of a mixture of the individual components. If desired, the above-named polyesters can be blended with another polyester, e.g., polyethyleneterephthalate, or with another polymer, such as ABS for example, provided the polymers be compatible with one another and with the flameproofing agent.

Especially good characteristics for fabrication and use are shown by those molding compositions whose polymer component consists wholly or mostly of polytetramethyleneterephthalate having a reduced viscosity of 1.2 to 2.0, preferably 1.3 to 1.6. Such molding compositions, therefore, represent a preferred embodiment of the invention, especially those whose polymer component consists wholly of polytetramethylene terephthalate.

The reduced viscosity is determined by the method described in "Preparative Methods of Polymer Chemistry" by W.R. Sorenson and T.W. Campbell, Interscience Publishers, Inc., New York, 1961, page 35.

A mixture of 1,1,2,2-tetrachloroethane and phenol (40 : 60 weight percent) is used as the solvent; 1 gm. of the polyester is dissolved in 100 ml. of solvent. The measurements are performed at 25° C.

Particularly isophthalic and/or terephthalic acid, preferably the latter, are used as aromatic dicarboxylic acids. The diphenyl or dialkyl (e.g., $C_1$–$C_4$) esters of the aromatic dicarboxylic acids, preferably dimethylterephthalate, are used as the polyester-forming derivatives. If desired, the dicarboxylic acid component may consist to a lesser extent of an aliphatic dicarboxylic acid, such as adipic acid, sebacic acid, dimeric fatty acids, and so forth.

Particularly contemplated diols are polyvalent alkanols of $C_3$–$C_8$ carbon atoms, Diols having 3 or 4 carbon atoms are preferred as the aliphatic diols, examples being 1,2-propanediol, 1,3-propanediol, 1,2-butanediol, 1,4-butanediol, 1,3-butenediol, or 2,3-butenediol. If desired, the diols can be used in mixtures with one another. Diols having more than 4 carbon atoms can also be used successfully as the diol component, such as hexanediol for example, or also those diols in which an oxygen atom is disposed between two carbon atoms.

1,4-butanediol is used preferentially as the diol component. The preparation of such polyesters on the basis of 1,4-butanediol is described, for example in German Offenlegungsschrift Nos. 2,045,914 and 2,213,259. In like manner, the polyesters or copolyesters can be prepared on the basis of diols having 3 or more than 4 carbon atoms.

According to German Offenlegungsschrift No. 2,213,259, it is possible to proceed, for example, by transesterifying dimethylterephthalate with excess 1,4-butanediol at temperatures under 200° C, removing by vacuum distillation at temperatures below 200° C any 1,4-butanediol that may remain in the dicarboxylic acid-bis-(4-hydroxybutylester), mixed in some cases with oligomers formed therefrom, esterifying the dicarboxylic acid-bis-(4-hydroxybutylester) and any oligomers that may have formed therefrom with a less than stoichiometric amount of dicarboxylic acid at temperatures from 200° to 250° C, and polycondensing the esterification product at temperatures between 250° and 310° C in vacuo, in a known manner. The reaction takes place in the presence of catalysts.

The 1,4-bis-($\beta,\gamma,\gamma$-trichloroallyl)-2,3,5,6-tetrachlorobenzene used in accordance with the invention as a flame-proofing agent can easily be prepared in high yields and in an economically advantageous manner from tetrachloro-p-xylenedichloride and trichloroethylene in the presence of anhydrous aluminum chloride in accordance with Ser. No. 485,689 of Egon Norbert Petersen, Hermann Richtzenhain and Klaus Dieter Steffen, entitled "In-Nucleus and Side-Chain Multiple Halogenated Propenyl Benzene Derivatives".

It can be prepared, for example, in the following manner: With the exclusion of moisture, 30 g of anhydrous, powdered aluminum chloride is suspended by stirring in 1.83 kg (= 1.25 l) of technically pure, dry trichloroethylene. 15 mg. of iodine is added to the suspension and it is heated to 60° C. At this temperature, 313 g (1 mole) of 1,4-bis-(chloromethyl)-2,3,5,6-tetrachlorobenzene (M.P. 172° to 177° C; 96 weight percent) is stirred into it such that the temperature does not increase above 70° C. Stirring is then continued at 60° C until solidification of the reaction mixture takes place (in about 20 minutes). The reaction is accompanied by a strong evolution of hydrogen chloride. After cooling down to about 40° C, the reaction mixture is placed with strong agitation in 2.5 liters of technical methanol, and then the yellowish-white crystallizate is strongly suction filtered, washed with methanol and dried. 472 g (93% of the theory) is obtained of 1,4-bis-($\beta,\gamma,\gamma$-trichloroallyl)-2,3,5,6-tetrachlorobenzene, having a melting point of 167° to 172° C. After recrystallization from methoxyethyl chloride in a 1:17 ratio, a colorless, analytically pure substance is obtained having a melting point of 176° to 178° C.

The flameproofing agent is mixed with the polyester preferably after the polycondensation is completed. Preferably, the compounding is performed in the melted state, in a strand press, in a mixing extruder, or on hot rolls, or similar devices. For example, good results are obtained in the compounding of polybutyleneterephthalate (prepared by condensation of dimethylterephthalate and 1,4-butanediol) by using a double screw extruder (Werner & Pfleiderer ZDSK 28, with kneading and mixing zone) and operating at the following temperatures:

Zone 1 (zone of entry) 210° C
Zone 2 230° C
Zone 3 240° C
Zone 4 240° C
Zone 5 240° C
Zone 6 (nozzle) 230° C Depending on the softening ranges of the polyesters used in accordance with the invention or on the decomposition temperature of the polyester, and on the flameproofing agent being mixed therewith, the temperatures in the mixing tools may be less than 210° C in some cases, or even over 240° C – 280° C for example — depending on the requirements.

Other additives, such as dyes and pigments, stabilizers, plasticizers or strengthening substances such as glass fibers, asbestos fibers or other fillers, may be added to the molding composition during the compounding process.

Surprisingly, the flameproofing agent used in accordance with the invention is stable at the temperatures required for the fabrication of the polyesters used. It decomposes at the combustion temperatures of the polyesters used in accordance with the invention, with the formation of flame-inhibiting fragments, that it is very compatible with the polymer and hence easily workable. Undesirable secondary reactions such as might be expected on account of the double bonds are observed neither in the preparation of the molding composition nor in the fabrication of the products. Furthermore, the compounds used in accordance with the invention display a great flame-inhibiting effect.

It is known in the art of chemical fireproofing that flame-inhibiting effects can be intensified by adding certain appropriate substances. Antimony compounds have proven to be especially appropriate. Examples are sodium antimonite, potassium antimonate, antimony sulfide, antimony salts of organic acids, but especially antimony trioxide ($Sb_2O_3$). These substances are preferably added to the flame stabilized polyester composition of this invention.

The antimony compounds, preferably $Sb_2O_3$, are added to the composition (mixture) of the invention in an amount of 0.5 to 15%, preferably 2 to 12%, of the weight of the polymers. Similarly known boron flameproofing compounds can be added to the composition which can also contain the antimony compounds. When the boron compounds are added they are present such that the combined amount of antimony and boron compounds are present in an amount of 0.5-15 weight percent, preferably 2-12 weight percent, based on the weight of the polyester.

The molding compositions of the invention are particularly well suited for the preparation of injection molded articles. Articles having good characteristics are achieved by operating with a screw type injection molding machine with a backflow blocking means (e.g., Monomat 150 S) and injecting into heated dies. In the case of molding compositions containing polybutyleneterephthalate the die temperature may be, for example, 50° to about 80° C.

The molding compositions of the invention may also be made into other products, such as sheets or the like, in a known manner, e.g., on conventional extruders.

In order the more fully illustrate the nature of the invention and the manner of practicing the same the following examples are presented.

EXAMPLES 1 TO 6

Polybutyleneterephthalate prepared from the condensation of dimethylterephthalate and 1,4-butanediol having a reduced viscosity of 1.6 determined at 25° C in a 40:60 weight percent mixture of 1,1,2,2-tetrachloroethane and phenol utilizing 1 gram of polyester dissolved in 100 ml of solvent, was charged into an extruder together with various amounts of 1,4-bis-($\beta,\gamma,\gamma$-trichloroallyl)-2,3,5,6-tetrachlorobenzene, as flameproofing agent. The various amounts used in Examples 1 to 6 are reported in the table below. The extruder was a double screw extruder made by Werner and Pfleiderer (ZDSK 28). This particular double screw extruder provides a kneading and mixing action and forms strands of 2 to 4 mm. thick as the polymeric mass emerges from the dye. The double screw extruder has various zones of heating. The polymer is heated at 210° C. as it enters the extruder and undergoes various zones of heating as follows: 230° C; 240° C; 240° C; 230° C and it emerges from the nozzle or dye at 230° C. The strands so formed were granulated and the so-formed granules were made into test specimens in a screw-type injection molding machine with an antibackflow (Monomat 150 S). The mole temperature was between 50° to 60° C.

The various specimens made were subjected to a number of different tests. For testing of the flameproofing action, an independent inhouse test was developed and used, which permits a judgment of the performance of suspended specimens of plastic when a flame is applied to them under defined conditions. On the basis of the time of application of the flame, the afterburning time, the dripping, the flame propagation and flame temperature, and of the formation of gas, scores ranging from 1 (very good) to 5 (poor) are given. Plastic specimens measuring 1.6 × 20 × 240 mm are suspended vertically from a suitable hanger in a square guard box open at the top and one side, and a flame is applied to their bottom ends from a non-incandescent, horizontal Bunsen burner flame 10 cm. long directed vertically against the bottom edge of the specimen at a distance of 10 cm. The behavior of the specimen is observed and the scores from 1 to 5 are arrived at on the basis of the time of application of the flame, the after-burning time, the dripping, and other criteria. The scores are defined as follows:

1. After a flame application time of at least 10 seconds the specimen is extinguished immediately after removal of the flame; any drips that might fall do not burn.
2. The specimen is extinguished a few seconds after removal of the flame; drips are extinguished as they fall.
3. The specimen continues to burn after removal of the test flame, but shortly is extinguished; drips continue to burn briefly.
4. The specimen continues to burn after removal of the test flame and is extinguished by the dripping off of the burning end; drips continue to burn for a longer time.
5. The specimen continues to burn fully after removal of the test flame; drips likewise.

The scores given in Table 1 are averages of 10 tests.

For confirmation of the results thus obtained, the flame-inhibiting action was tested by means of the "oxygen index" test of ASTMD 2863-70. This indicates the $O_2$ percentage in an oxygen-nitrogen mixture at which a substance will continue to burn spontaneously under defined conditions, values of 3 to 4 units above the value corresponding to the polymer free of flameproofing agents representing good results.

In the case of Examples 1 (standard), 4, 6 and 7, the UL 94 test proposed by Underwriters Laboratories, U.S.A., was performed in order to confirm the results.

This test is performed as follows: A test specimen 5 inches long, ½ inch wide, ⅛ to 1/16 inch thick, is suspended vertically in a guard box and burned from below for 10 seconds with a defined Bunsen burner flame. The fire ratings VE O, VE I and VE II are determined as follows:

VE O: No afterburning time longer than 10 seconds.
    Average afterburning time does not exceed 5 seconds,
    Afterglow does not exceed 30 seconds.
VE I: No afterburning time longer than 30 seconds.
    Average not over 25 seconds.
    Afterglow not over 60 sec
VE II: As soon as drips falling under the above conditions ignite tinder.
Failed: Afterburning time longer than 30 seconds.
    Average longer than 25 seconds.

The test flame is applied to the extinguished end for a second time.

The test is performed on specimens which have been stored for 48 hours at 50% atmospheric humidity at 23° C, and is repeated on specimens stored for 168 hours at 70° C.

The values given in the table are averages of five tests.

There is set forth in Table I below the results of the test for the various sample numbers. The antimony oxide was added during the passage of the molding mass through the double screw extruder.

TABLE 1

| Example No. | FPA[1] Parts per 100 parts per Polyester | Sb$_2$O$_3$ | Dynamit Nobel Test Scores | Oxygen Index % O$_2$ | UL 94 |
|---|---|---|---|---|---|
| Standard for comparison | 0 | 0 | 5 | 23 | failed |
| 2 | 15 | 5 | 2 | 29 | — |
| 3 | 15 | 2.5 | 2 | 29 | — |
| 4 | 20 | 5 | 1 | 31 | VE 0 |
| 5 | 20 | 2.5 | 1 | 31 | — |
| 6 | 25 | 5 | 1 | 32 | VE 0 |
| 7 | 25 | 2.5 | 1 | 32 | VE 0 |

[1]Flame proofing agent - 1,4-bis-(,γ,γ-trichlorollyl)-2,3,5,6-tetrachlorobenzene

What is claimed is:

1. A flame stabilized molding composition comprising:
   1. A polyester which is the condensation product of an aromatic dicarboxylic acid, acid-halide or ester and an aliphatic diol having more than 2 carbon atoms in the chain; and
   2. 1,4-bis-(β,γ,γ-trichloroallyl)-2,3,5,6-tetrachlorobenzene, as flameproofing agent, which has the formula:

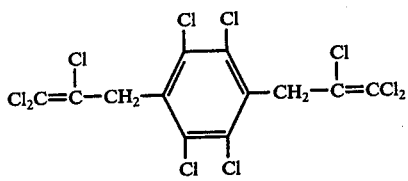

said 1,4-bis-(β,γ,γ-trichloroallyl)-2,3,5,6-tetrachlorobenzene being present in said composition in an amount of 5-30 weight percent based upon the weight of said polyester.

2. A flame stabilized molding composition according to claim 1 wherein said 1,4-bis-(β,γ,γ-trichloroallyl)-2,3,5,6-tetrachlorobenzene is present in said molding composition in an amount of 10-25 weight percent based upon the weight of said polyester.

3. A flame stabilized molding composition according to claim 1 wherein said polyester is the condensation product of:
   a. dimethylterephthalate, and
   b. a diol having 3 or 4 carbon atoms.

4. A polyester molding composition according to claim 1 wherein said molding composition contains, as a polyester component, a polytetramethylene terephthalate having a reduced viscosity of 1.2 to 2.0, determined at 25° C employing 1 gm. of polyester in 100 ml. of solvent which solvent is a 40:60 weight percent mixture of 1,1,2,2-tetrachloroethane and phenol.

5. A polyester molding composition according to claim 4 wherein the polyester has a reduced viscosity of 1.3 to 1.6.

6. A polyester molding composition according to claim 1 containing an antimony compound in an amount of 0.5 to 15 weight percent based upon the weight of the polyester in the molding composition.

7. A molding composition according to claim 6 wherein said antimony compound is present in said molding composition in an amount of 2 to 12 weight percent based upon the weight of the polyester in said molding composition.

8. A molding composition according to claim 7 wherein said antimony compound is selected from the group consisting of sodium antimonite, potassium antimonate, antimony sulfide, an antimony salt of an organic acid, and antimony trioxide.

9. A molding composition according to claim 1 containing a boron flameproofing compound in an amount of 0.5 to 15 weight percent based upon the weight of polyester in the molding composition.

10. A molding composition according to claim 1 containing between 2 and 12 weight percent of a boron flameproofing agent, based upon the weight of the polyester in the molding composition.

* * * * *